United States Patent
Park et al.

(10) Patent No.: US 10,522,039 B2
(45) Date of Patent: Dec. 31, 2019

(54) PEDESTRIAN RECOGNITION APPARATUS AND METHOD

(71) Applicant: PLK Technologies Co., Ltd., Seoul (KR)

(72) Inventors: Kwang Il Park, Seoul (KR); Sang Mook Lim, Seoul (KR); Jin Hyuck Kim, Seoul (KR)

(73) Assignee: PLK TECHNOLOGIES CO., LTD., Seoul (KR)

( * ) Notice: Subject to any disclaimer, the term of this patent is extended or adjusted under 35 U.S.C. 154(b) by 250 days.

(21) Appl. No.: 15/560,267

(22) PCT Filed: Jun. 15, 2015

(86) PCT No.: PCT/KR2015/005995
§ 371 (c)(1),
(2) Date: Sep. 21, 2017

(87) PCT Pub. No.: WO2016/159442
PCT Pub. Date: Oct. 6, 2016

(65) Prior Publication Data
US 2018/0075748 A1    Mar. 15, 2018

(30) Foreign Application Priority Data

Apr. 1, 2015  (KR) .................. 10-2015-0045896

(51) Int. Cl.
*G08G 1/16* (2006.01)
*B60W 10/20* (2006.01)
(Continued)

(52) U.S. Cl.
CPC ............. *G08G 1/166* (2013.01); *B60Q 5/006* (2013.01); *B60R 1/00* (2013.01); *B60T 7/22* (2013.01);
(Continued)

(58) Field of Classification Search
CPC ..... G08G 1/166; G06K 9/6269; G06K 9/4604; G06K 9/00805; G06K 9/4642;
(Continued)

(56) References Cited

U.S. PATENT DOCUMENTS

2014/0341474 A1* 11/2014 Dollar ................ G06K 9/00711
                                                             382/197
2015/0146919 A1   5/2015 Ryu et al.
2016/0364619 A1* 12/2016 Ogata ................ G06K 9/00362

FOREIGN PATENT DOCUMENTS

KR         10-0499267 B1      7/2005
KR     10-2013-0095525 A      8/2013
(Continued)

OTHER PUBLICATIONS

Beiping et al. "Fast Human Detection Using Motion Detection and Histogram of Oriented Gradients"; Journal of Computers, vol. 6, No. 8. Published Aug. 2011. (see attached PDF version, "Beiping") (Year: 2011).*

*Primary Examiner* — Nadeem Odeh
*Assistant Examiner* — Michael V Kerrigan
(74) *Attorney, Agent, or Firm* — Rabin & Berdo, P.C.

(57) ABSTRACT

The present invention relates to a pedestrian recognition apparatus. A pedestrian recognition apparatus may comprises: an image receiving unit configured to sequentially receive a plurality of images from a camera; and a pedestrian determination unit configured to perform a pedestrian candidate object detection process of detecting a pedestrian candidate object from one or more objects in the images, a mobility determination process of determining whether the pedestrian candidate object is moving, using the plurality of images, and setting the pedestrian candidate object to a moving pedestrian candidate object, and a pedestrian possibility determination process of performing a predefined operation on the moving pedestrian candidate object, and (Continued)

setting the moving pedestrian candidate object to a pedestrian when a value calculated through the predefined operation is equal to or more than a threshold value.

10 Claims, 8 Drawing Sheets

(51) Int. Cl.
    *B60W 40/02*     (2006.01)
    *B60W 50/14*     (2012.01)
    *G06K 9/62*     (2006.01)
    *B60W 30/08*     (2012.01)
    *B60Q 5/00*     (2006.01)
    *B60R 1/00*     (2006.01)
    *B60T 7/22*     (2006.01)
    *G06K 9/00*     (2006.01)
    *G06K 9/46*     (2006.01)

(52) U.S. Cl.
    CPC ............ *B60W 10/20* (2013.01); *B60W 30/08* (2013.01); *B60W 40/02* (2013.01); *B60W 50/14* (2013.01); *G06K 9/00362* (2013.01); *G06K 9/00805* (2013.01); *G06K 9/4604* (2013.01); *G06K 9/4642* (2013.01); *G06K 9/6269* (2013.01); *B60R 2300/105* (2013.01); *B60R 2300/308* (2013.01); *B60R 2300/8033* (2013.01); *B60R 2300/8093* (2013.01); *B60T 2201/022* (2013.01); *B60T 2210/32* (2013.01)

(58) Field of Classification Search
    CPC . G06K 9/00362; B60T 7/22; B60T 2201/022; B60T 2210/32; B60R 1/00; B60R 2300/105; B60R 2300/308; B60R 2300/8033; B60R 2300/8093; B60Q 5/006; B60W 40/02; B60W 30/08; B60W 10/20; B60W 50/14
    See application file for complete search history.

(56) References Cited

FOREIGN PATENT DOCUMENTS

| | | |
|---|---|---|
| KR | 10-2014-0071121 A | 6/2014 |
| KR | 10-1427032 B1 | 8/2014 |
| KR | 10-1489836 B1 | 2/2015 |
| KR | 10-1498114 B1 | 3/2015 |

* cited by examiner

PEDESTRIAN RECOGNITION APPARATUS AND METHOD

TECHNICAL FIELD

The present disclosure relates to a pedestrian recognition technology, and more particularly, to a pedestrian recognition apparatus and method capable of recognizing an object around a vehicle and determining whether the recognized object is a pedestrian.

BACKGROUND ART

In general, an around view monitoring system refers to a system that shows a situation in the range of 360 degrees around a vehicle through four cameras installed outside the vehicle. The around view monitoring system may display a situation around the vehicle on a monitor such that a driver feels as if the driver looked down from the sky, and allow the driver to monitor a parking space or driving space around the vehicle. Therefore, the around view monitoring system may enable the driver to easily park or drive the vehicle in a narrow space.

Korean Patent Registration No. 10-0499267 discloses a rear view monitoring system which is capable of displaying a rearward image and a distance to a rearward object such that a driver can check the rearward object when backing a vehicle or making a turn. Such a technique provides a distance between the vehicle and the rearward object with the rearward image, and allows the driver to conveniently and safely drive the vehicle.

Korean Patent Publication No. 10-2013-0095525 discloses an around view system and an around view providing system, which can provide an around view image and forward and rearward images of a vehicle, process the forward and rearward images such that more images can be displayed in the traveling direction of the vehicle depending on a steering angle change, and display the images on the screen. Such a technique allows a driver to have a better view in the traveling direction of the vehicle.

RELATED ART DOCUMENT

Patent Document (Patent Document 1) Korean Patent Registration No. 10-0499267
(Patent Document 2) Korean Patent Publication No. 10-2013-0095525

DISCLOSURE

Technical Problem

Various embodiments are directed to a pedestrian recognition apparatus capable of recognizing an object around a vehicle and determining whether the recognized object is a pedestrian.

Also, various embodiments are directed to a pedestrian recognition apparatus capable of determining whether an object in an image received from a camera is a pedestrian, based on the mobility of the object, and determining a collision possibility with a vehicle.

Further, various embodiments are directed to a pedestrian recognition apparatus capable of displaying a visual guidance on a pedestrian according to a collision possibility between the pedestrian and a vehicle.

Technical Solution

In an embodiment, a pedestrian recognition apparatus may comprises: an image receiving unit configured to sequentially receive a plurality of images from a camera; and a pedestrian determination unit configured to perform a pedestrian candidate object detection process of detecting a pedestrian candidate object from one or more objects in the images, a mobility determination process of determining whether the pedestrian candidate object is moving, using the plurality of images, and setting the pedestrian candidate object to a moving pedestrian candidate object, and a pedestrian possibility determination process of performing a predefined operation on the moving pedestrian candidate object, and setting the moving pedestrian candidate object to a pedestrian when a value calculated through the predefined operation is equal to or more than a threshold value.

The pedestrian recognition apparatus further comprises a pedestrian collision possibility determination unit configured to determine that the pedestrian and the vehicle are likely to collide with each other, when the distance between the pedestrian and the vehicle decreases, and overlay a visual guidance on the object.

The pedestrian determination unit cyclically performs the pedestrian candidate object detection process, the mobility determination process and the pedestrian possibility determination process, and determines the possibility that the one or more objects are pedestrians.

The pedestrian determination unit further performs an object extraction process of extracting the one or more objects in the received image before the pedestrian candidate object detection process.

The pedestrian determination unit detects vertical components of the one or more objects in the pedestrian candidate object detection process, and determines a similarity between the detected vertical components and a pedestrian pattern.

The pedestrian determination unit determines the mobility of the pedestrian candidate object based on differences of the same pedestrian candidate object in images from the current time to a specific previous time, during the mobility determination process.

During the pedestrian possibility determination process, the pedestrian determination unit performs a HOG (Histogram of Oriented Gradient) operation on the moving pedestrian candidate object, performs an SVM weight operation on the HOG operation result, and sets the pedestrian candidate object to a pedestrian when the operation result is equal to or more than a preset threshold value.

The pedestrian determination unit estimates a region of the pedestrian candidate object, corresponding to the HOG operation region, based on the near and far degree of the received image.

The pedestrian determination unit adjusts the size of the region of the pedestrian candidate object through a plurality of cells having a variable size.

The pedestrian recognition apparatus further comprises an autonomous emergency braking unit configured to check a collision possibility of the corresponding object with a vehicle, based on a distance between the object and the vehicle, and control the vehicle to perform one or more of velocity reduction and warning sound generation.

In other embodiment, a pedestrian recognition method may comprises: sequentially receiving a plurality of images from a camera; and detecting a pedestrian candidate object from one or more objects in the images, determining whether the pedestrian candidate object is moving, based on the plurality of images, setting the pedestrian candidate object to a moving pedestrian candidate object, performing a predefined operation on the moving pedestrian candidate object, and setting the moving pedestrian candidate object to a pedestrian when a value calculated through the predefined operation is equal to or more than a threshold value.

The pedestrian recognition method further comprises determining that the vehicle and the pedestrian are likely to collide with each other, when the distance between the pedestrian and the vehicle decreases, and overlaying a visual guidance on the object.

The pedestrian recognition method further comprises determining that the vehicle and the pedestrian are likely to collide with each other, when the distance between the pedestrian and the vehicle decreases, and controlling the vehicle to perform one or more of velocity reduction and warning sound generation.

Advantageous Effects

In accordance with the embodiment of the present invention, the pedestrian recognition apparatus may recognize an object around a vehicle, and determine whether the object is a pedestrian.

Furthermore, the pedestrian recognition apparatus may determine whether an object in an image received from the camera is a pedestrian, based on the mobility of the object, and determine a possibility of collision with the vehicle.

Furthermore, the pedestrian recognition apparatus may display a visual guidance on the pedestrian, depending on a collision possibility between the pedestrian and the vehicle.

MODE FOR INVENTION

The description of the present invention is merely an example for structural or functional explanation, and the scope of the present invention should not be construed as being limited by the embodiments described in the text. That is, the embodiments are to be construed as being variously embodied and having various forms, so that the scope of the present invention should be understood to include equivalents capable of realizing technical ideas. Also, the purpose or effect of the present invention should not be construed as limiting the scope of the present invention, since it does not mean that a specific embodiment should include all or only such effect.

Meanwhile, the meaning of the terms described in the present application should be understood as follows.

The terms "first", "second" and the like are intended to distinguish one element from another, and the scope of the right should not be limited by these terms. For example, the first component may be referred to as a second component, and similarly, the second component may also be referred to as a first component.

It is to be understood that when an element is referred to as being "connected" to another element, it may be directly connected to the other element, but there may be other elements in between. On the other hand, when an element is referred to as being "directly connected" to another element, it should be understood that there are no other elements in between. On the other hand, other expressions that describe the relationship between the components, such as "between" and "between" or "neighboring to" and "directly adjacent to" should be interpreted as well.

The use of the singular should be understood to include plural representations unless the context clearly dictates otherwise, and the terms "comprise" or "having", etc. are intended to include the features, numbers, steps, operations, components, It is to be understood that the combinations are intended to specify the presence or absence of one or more other features, integers, steps, operations, components, parts, or combinations thereof.

In each step, the identification code (e.g., a, b, c, etc.) is used for convenience of explanation, the identification code does not describe the order of the steps, Unless otherwise stated, it may occur differently from the stated order. That is, each step may occur in the same order as described, may be performed substantially concurrently, or may be performed in reverse order.

All terms used herein have the same meaning as commonly understood by one of ordinary skill in the art to which this invention belongs, unless otherwise defined. Commonly used predefined terms should be interpreted to be consistent with the meanings in the context of the related art and cannot be interpreted as having ideal or overly formal meaning unless explicitly defined in the present application.

Figure 1A:
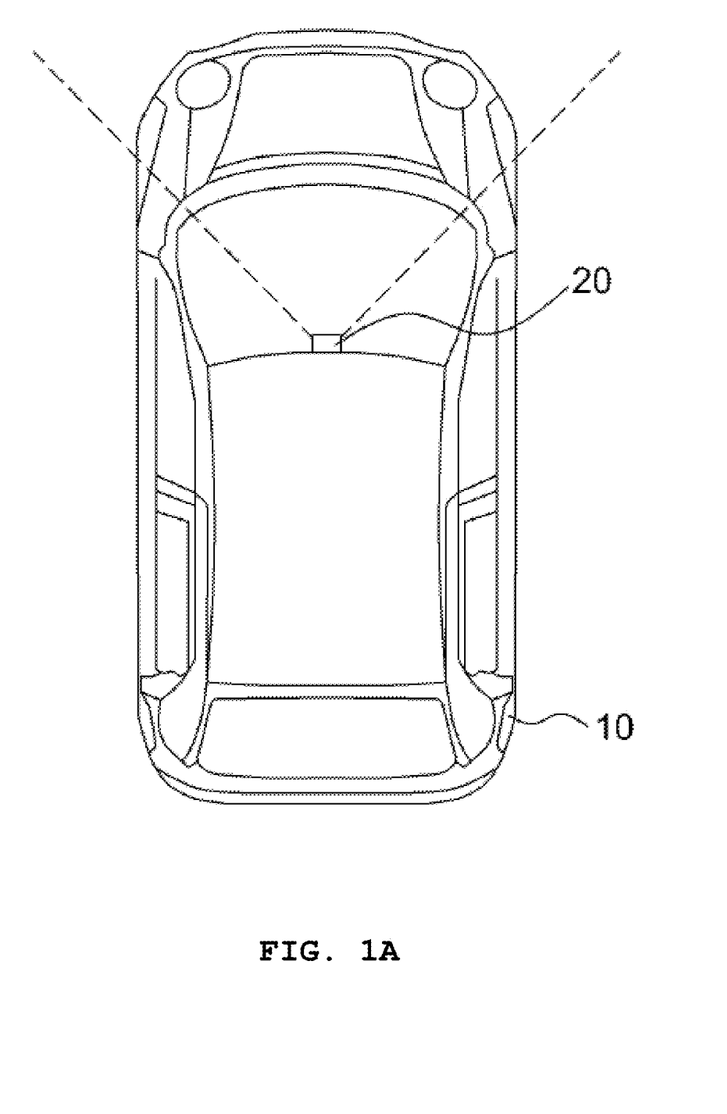
FIGS. 1A and 1B are plan views for describing a pedestrian recognition apparatus in accordance with an embodiment of the present invention.
Figure 1B:
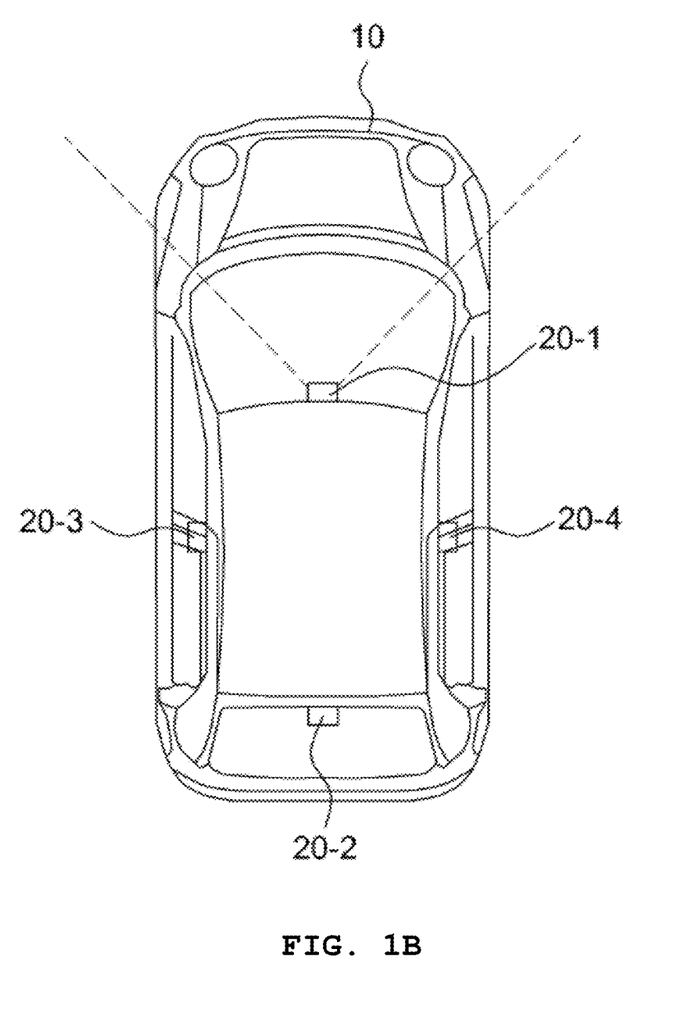

FIGS. 1A and 1b are plan views for describing a pedestrian recognition apparatus in accordance with an embodiment of the present invention.

Referring to FIG. 1A, the pedestrian recognition apparatus 100 may be installed in a vehicle 10, and determine whether an object around a vehicle 10 is a pedestrian, based an image acquired through a camera 20. The camera 20 may generate one or more images by filming a situation around the vehicle at one or more times. In an embodiment, the camera 20 may be installed at the front of the vehicle 10, and film an environment in front of the vehicle 10. In another embodiment, the camera 20 may be installed at the front, rear and both sides of the vehicle 10, and film surrounding environments at the front, rear and both sides of the vehicle 10.

When the object around the vehicle 10 corresponds to a pedestrian, the pedestrian recognition apparatus 100 may generate a visual guidance depending on a collision possibility of the vehicle 10 with the pedestrian. The visual guidance corresponds to a guide which is visually provided to a driver. The pedestrian recognition apparatus 100 may control the vehicle to perform one or more of velocity reduction and warning sound generation, depending on the collision possibility of the vehicle 10 with the pedestrian. Hereafter, the pedestrian recognition apparatus 100 will be described in detail with reference to FIG. 2.

Figure 2:
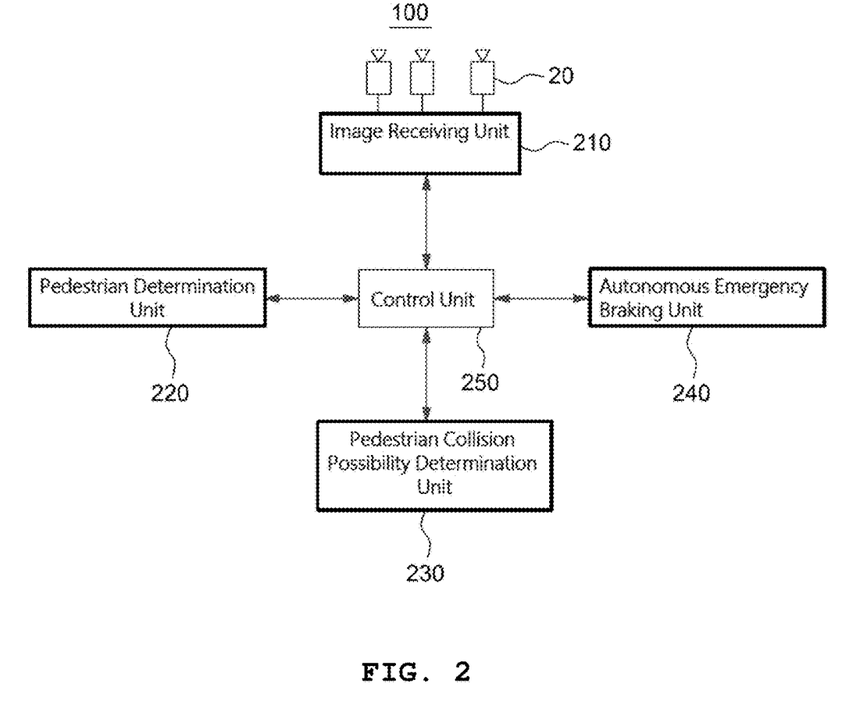
FIG. 2 is a block diagram illustrating the pedestrian recognition apparatus of FIG. 1.
Figure 3:
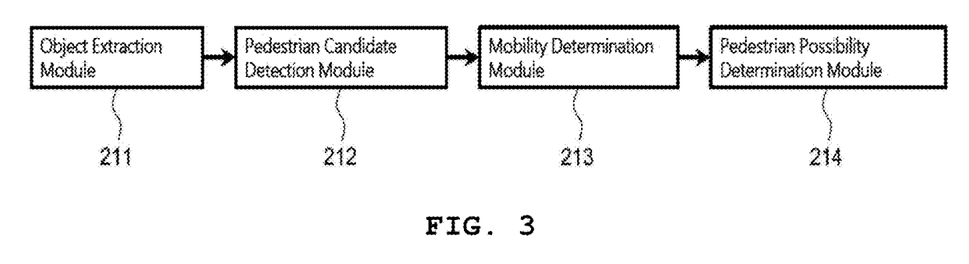
FIG. 3 is a block diagram illustrating a pedestrian determination unit of the pedestrian recognition apparatus of FIG. 1.

FIG. 2 is a block diagram illustrating the pedestrian recognition apparatus of FIGS. 1A and 1B, and FIG. 3 is a block diagram illustrating a pedestrian determination unit of the pedestrian recognition apparatus of FIGS. 1A and 1B.

Referring to FIGS. 2 and 3, the pedestrian recognition apparatus 100 includes an image receiving unit 210, a pedestrian determination unit 220, a pedestrian collision possibility determination unit 230, an autonomous emergency braking unit 240 and a control unit 250.

The image receiving unit 210 receives an image from the camera 20. The image receiving unit 210 may generate an around view based on the image acquired from the camera 20. The around view corresponds to a real-time image which is generated based on a plurality of images taken by the cameras 20 installed at the front, rear and both sides of the vehicle 10, the real-time image allowing a driver to feel as if the driver looked down at surrounding environments in the range of 360 degrees around the vehicle 10.

In an embodiment, the image receiving unit 210 may generate a time-series around view by combining two or more around views based on the images taken by the camera 20. The two or more around views may be generated based on continuous-time images.

The pedestrian determination unit 220 includes an object extraction module 211, a pedestrian candidate detection module 212, a mobility determination module 213 and a pedestrian possibility determination module 214.

The object extraction module 211 extracts one or more objects from an image received from the camera 20 before a pedestrian candidate detection process. The object may include both a dynamic object and static object. The dynamic object may include a pedestrian and animal, and the static object may include a tree and sign. The object extraction module 211 may detect edges (or boundary lines) in the image, and extract one or more objects each having an area equal to or more than a predetermined size distinguished by the edges. For example, the object extraction module 211 extract an area equal to or more than a predetermined size distinguished by the edges as an object, and ignore areas less than the predetermined size.

In an embodiment, the object extraction module 211 may extract one or more objects based on a color difference between the background and the object in the image. The object extraction module 211 may calculate pixel values of the image, group areas having similar color values, and extract one group as one object. The pixels of the object may be grouped into one group based on the characteristic that the pixels have similar color values.

In another embodiment, the object extraction module 211 may detect a boundary line in an image and extract an object, using an edge detection algorithm such as the Canny edge detection algorithm, the line edge detection algorithm or the Laplacian edge detection algorithm. For example, the object extraction module 211 may extract an object by grouping areas distinguished from the background based on the detected boundary line.

The pedestrian candidate detection module 212 detects a pedestrian candidate object from one or more objects extracted by the object extraction module 211 through simple feature analysis. The pedestrian candidate object may include one or more objects which are likely to correspond to a pedestrian. The pedestrian candidate detection module 212 may extract a feature corresponding to a specific feature of a pedestrian (detection target object) from the object and compare the extracted feature to the specific feature of the pedestrian, thereby previously removing an object unrelated to the pedestrian (detection target object). Through this operation, the pedestrian recognition apparatus in accordance with the present embodiment can reduce the operation amount and improve the processing speed.

For example, the pedestrian candidate detection module 212 may detect a vertical component for the extracted one or more objects, determine a similarity between the detected vertical component and the pedestrian pattern, and detect a pedestrian candidate object. In an embodiment, the pedestrian candidate detection module 212 may analyze edges of the extracted object, and detect vertical components of the edges. When the vertical components of the edges of the extracted object are similar to a predefined pedestrian pattern, the pedestrian candidate detection module 212 may primarily verify that the extracted object corresponds to a pedestrian candidate object. The predefined pedestrian pattern may include an upper part and a lower part, which are defined based on the horizontal line at a point from which the vertical component diverges into two parts, the upper part having a length ranging from 60 to 140% of that of the lower part, and the lower part of the vertical component diverges into two parts in the longitudinal direction from the horizontal line. For example, the pedestrian candidate detection module 212 may detect vertical edges (or edges having a slope within a predetermined angle with the vertical direction) among the edges for the object, compare a shape formed by the detected edges to the vertical reference shape of a person, stored in a predetermined table, and detect the corresponding object as a pedestrian candidate object when the similarity between both shapes is equal to or more than a threshold value.

The pedestrian candidate detection module 212 may analyze an internal region of the edges for the primarily verified pedestrian candidate object, and finally verify that the primarily verified pedestrian candidate object is a pedestrian candidate object, when the internal region is similar to the pedestrian pattern. For example, the pedestrian pattern may correspond to a pattern having an empty region formed by edges in the lower part of the vertical component.

The mobility determination module 213 compares a previous image to a current image, and determines whether the pedestrian candidate object is moving. The mobility determination module 213 may determine whether the pedestrian candidate object is moving, based on differences of the same pedestrian candidate object in images from the current time to a specific previous time. At this time, the mobility determination module 213 may determine the identity of the same pedestrian candidate object, based on the predefined pattern of the pedestrian candidate object.

In an embodiment, the mobility determination module 213 may extract motion vectors for the same pedestrian candidate object from the images from the current time to a specific previous time, and detect one or more of forward and backward movement and left and right movement. The motion vector may indicate the direction and magnitude of a motion. The forward and backward movement and the left and right movement may be detected according to a change between a motion vector of the pedestrian candidate object in an image frame at a first time and a motion vector of the pedestrian candidate object in an image frame at a second time corresponding to a point of time before the first time.

In another embodiment, the mobility determination module 213 may determine whether the pedestrian candidate object is moving, using a difference between an image at a previous time and an image at the current time.

For example, the mobility determination module 213 divides the image frame of the current time (for example, k-th image frame) and the image frame of the previous time (for example, (k−1)th image frame) into a predetermined size of blocks. The block may include m×n pixels where m and n are integers. The mobility determination module 213 may calculate differences in pixel value between a specific block selected from the k-th image frame and the respective blocks of the (k−1)th image frame, and determine whether the pedestrian candidate object is moving, based on the pixel value differences.

For example, when a pedestrian candidate object is included in the specific block (or blocks) of the k-th image frame, the mobility determination module 213 compares the corresponding block of the k-th image frame to a block located at a predetermined position in the (k−1)th image frame, and calculates differences in pixel value between the corresponding pixels of the blocks. The mobility determination module 213 calculates the sum of absolute difference (SAD) by summing up the absolute values of the pixel value differences between the corresponding pixels of the blocks. The SAD may be calculated through Equation 1 below.

$$SAD = \sum_{i=1}^{N}\sum_{j=1}^{M} |(I_{ij}(k) - I_{ij}(k-1))|$$ [Equation 1]

In Equation 1, $I_{ij}(k)$ represents the pixel value of an i-th row and a j-th column of a block in a k-th image frame, and $I_{ij}(k-1)$ represents the pixel value of an i-th row and a j-th column of a block in a (k−1)th image frame.

After calculating the SAD between the blocks corresponding to each other at first, the mobility determination module 213 calculates an SAD while changing the positions of the specific block of the k-th image frame (block or blocks including the moving object candidate) and the block of the (k−1)th image frame corresponding to the specific block. For example, the mobility determination module 213 may calculate an SAD between blocks while changing the positions of the blocks in a spiral direction in the (k−1)th image frame.

After calculating the SAD of each block, the mobility determination module 213 detects the block having the smallest SAD in the (k−1)th image frame. The mobility determination module 213 may calculate the SADs by comparing a specific block of the k-th image frame (block or blocks including the pedestrian candidate object) to the blocks of the (k−1)th image frame. As a result, the block (blocks) of the (k−1)th image frame, having the smallest SAD, may correspond to the specific block of the k-th image frame.

The mobility determination module 213 may set the pedestrian candidate object to a moving pedestrian candidate object, based on whether the positions of blocks corresponding to each other in the k-th image frame and the (k−1)th image frame were changed. The pedestrian possibility determination module 214 determines the possibility that the pedestrian candidate object is a pedestrian. The pedestrian possibility determination module 214 performs a HOG (Histogram of Oriented Gradient) operation on the moving pedestrian candidate object, and performs an SVM (Support Vector Machine) on the HOG operation result for the moving pedestrian candidate object. When the value calculated through the SVM weight operation performed on the HOG operation result is equal to or more than a preset threshold value, the pedestrian possibility determination module 214 may set the moving pedestrian candidate object to a pedestrian. The HOG operation indicating the directions of edges using histograms may be used when the shape of an object is not significantly changed and has a simple internal pattern and the object can be identified by the contour line of the object. In the above-described embodiment, the k-th image frame and the (k−1)th image frame were used as the current image frame and the previous image frame. The technical idea of present invention is not limited thereto. That is, it is obvious to those skilled in the art that the k-th image frame and the (k−10)th image frame can be used as the current image frame and the previous image frame. Therefore, the detailed descriptions thereof are omitted herein, in order not to obscure subject matters of the present invention.

Figure 4:
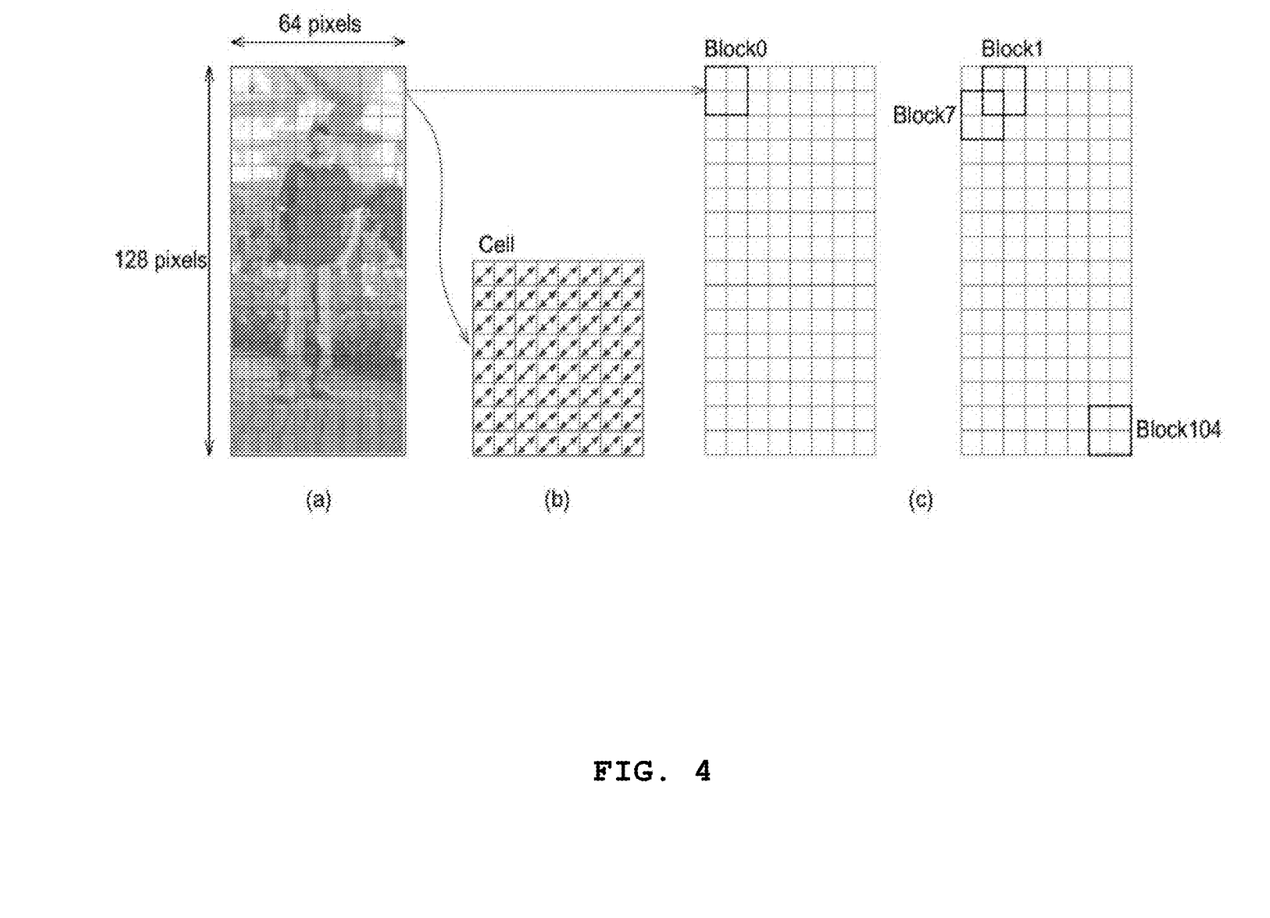
FIGS. 4A to 4C illustrate a process of performing a HOG operation on a pedestrian candidate object.

FIGS. 4A to 4C illustrate the process of performing a HOG operation on the pedestrian candidate object.

The pedestrian possibility determination module 214 extracts a region including the moving pedestrian candidate object from an image frame in order to perform a HOG operation.

For convenience of description, the following descriptions are based on the supposition that the pedestrian possibility determination module 214 extracts a region having a size of 64 pixels×128 pixels (FIG. 4A). The pedestrian possibility determination module 214 defines the extracted region using a predetermined size of cells and a predetermined size of blocks. For example, the cell may have a size of 8 pixels×8 pixels, and the block may have a size of 2 cells×2 cells or 3 cells×3 cells. The sizes of the cell and the block may be changed depending on an embodiment.

For convenience of description, the following descriptions are based on the supposition that the cell has a size of 8 pixels×8 pixels and the block has a size of 2 cells×2 cells. The pedestrian possibility determination module 214 may divide the extracted region into 8 cells×16 cells or a total of 128 cells (FIG. 4B). The cells may be arranged adjacent to each other. The pedestrian possibility determination module 214 may define blocks each of which has a cell line overlapping a cell line of another block in the vertical or horizontal direction, thereby defining 7 blocks×15 blocks or a total of 105 blocks in the extracted region (FIG. 4C)

Figure 5:
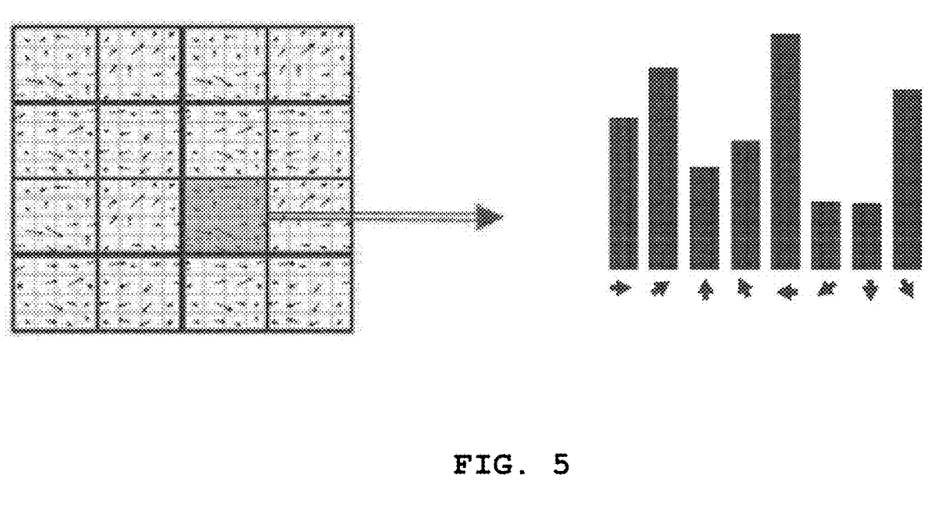
FIG. 5 illustrates a process of expressing the directions of edges in a cell and the values of the directions as histograms.

The pedestrian possibility determination module 214 calculates the directions of edges in a cell by performing a HOG operation on a cell basis. In an embodiment, the pedestrian possibility determination module 214 may standardize the directions of the angles into a predefined number of angle bins. FIG. 5 illustrates illustrating a process of expressing the directions of edges in a cell and the values of the directions as histograms. Referring to FIG. 5, the directions of edges within a cell are standardized into eight angle bins, and the values of the respective angle bins are expressed as histograms.

The pedestrian possibility determination module 214 performs normalization on each block by dividing the values of the directions of the edges calculated for each cell by the average value of a block to which the corresponding cell belongs. The pedestrian possibility determination module 214 can reduce an influence of illumination or contrast on an operation result through the normalization.

After performing normalization on each block, the pedestrian possibility determination module 214 calculates a descriptor vector by enumerating the normalized values for each block. For example, the pedestrian possibility determination module 214 may calculate a descriptor vector by enumerating the normalized values for the directions of the edges for each block in a predefined order. The descriptor vector indicates a HOG feature of the corresponding block.

The pedestrian possibility determination module 214 may perform an SVM weight operation on the calculated descriptor vector, and set the corresponding moving pedestrian candidate object to a pedestrian when a value obtained by performing the SVM weight operation is equal to or more than a preset threshold value.

FIGS. 6A to 6G illustrate the process of determining a pedestrian by performing an SVM weight operation on a descriptor vector.

Figure 6:
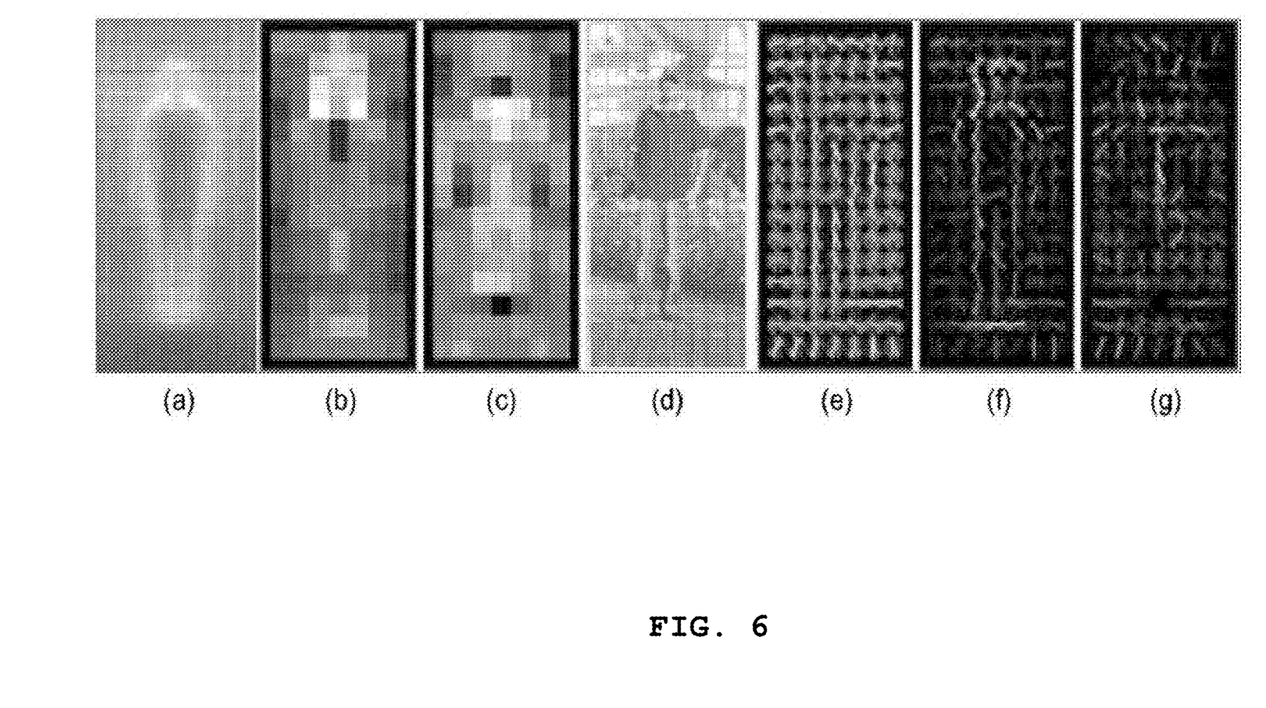
FIGS. 6A to 6G illustrate a process of determining a pedestrian by performing an SVM weight operation on a descriptor vector.

FIG. 6A illustrates an average gradient image of images for a detection target object (pedestrian). FIG. 6B illustrates positive SVM weights which are calculated based on the average gradient image of FIG. 6A, and FIG. 6C illustrates negative SVM weights which are calculated based on the average gradient image of FIG. 6A. The process of calculating an SVM weight based on the gradient image is obvious to those skilled in the art. Thus, the detailed descriptions thereof are omitted herein, in order not to obscure subject matters of the present invention.

FIG. 6D illustrates a region including the pedestrian candidate object, extracted from an image frame, and FIG. 6E illustrates descriptor vectors calculated by performing a HOG operation on FIG. 6D. In FIG. 6D, as the values for the directions get higher, the values are displayed more brightly, based on the descriptor vectors calculated for the respective cells.

FIG. 6F illustrates a result obtained by applying the positive SVM weights (FIG. 6B) to the descriptor vectors (FIG. 6D) calculated for the respective cells, and FIG. 6G illustrates a result obtained by applying the negative SVM weights (FIG. 6C) to the descriptor vectors (FIG. 6D) calculated for the respective cells. FIG. 6F illustrates descriptor vectors that are the nearest to the detection target object (pedestrian) among the descriptor vectors, and FIG. 6G illustrates descriptor vectors that are the farthest from the detection target object (pedestrian) among the descriptor vectors.

The pedestrian possibility determination module 214 may set the corresponding moving pedestrian candidate object to a pedestrian when a value obtained by applying the positive SVM weight to the calculated descriptor vector is equal to or more than a preset threshold value.

In an embodiment, the pedestrian possibility determination module 214 may estimate a region of the pedestrian candidate object corresponding to the HOG operation region based on the near and far degree of the image received from the camera 20. When the moving object candidate object is away from the camera, the moving pedestrian candidate object may be estimated to have a larger size than when the moving object candidate object is close to the camera. The near and far degree of the moving pedestrian candidate object may be decided based on a depth value (Z-axis). The region of the pedestrian candidate object may be set to a rectangle including the moving pedestrian candidate object.

Figure 7:
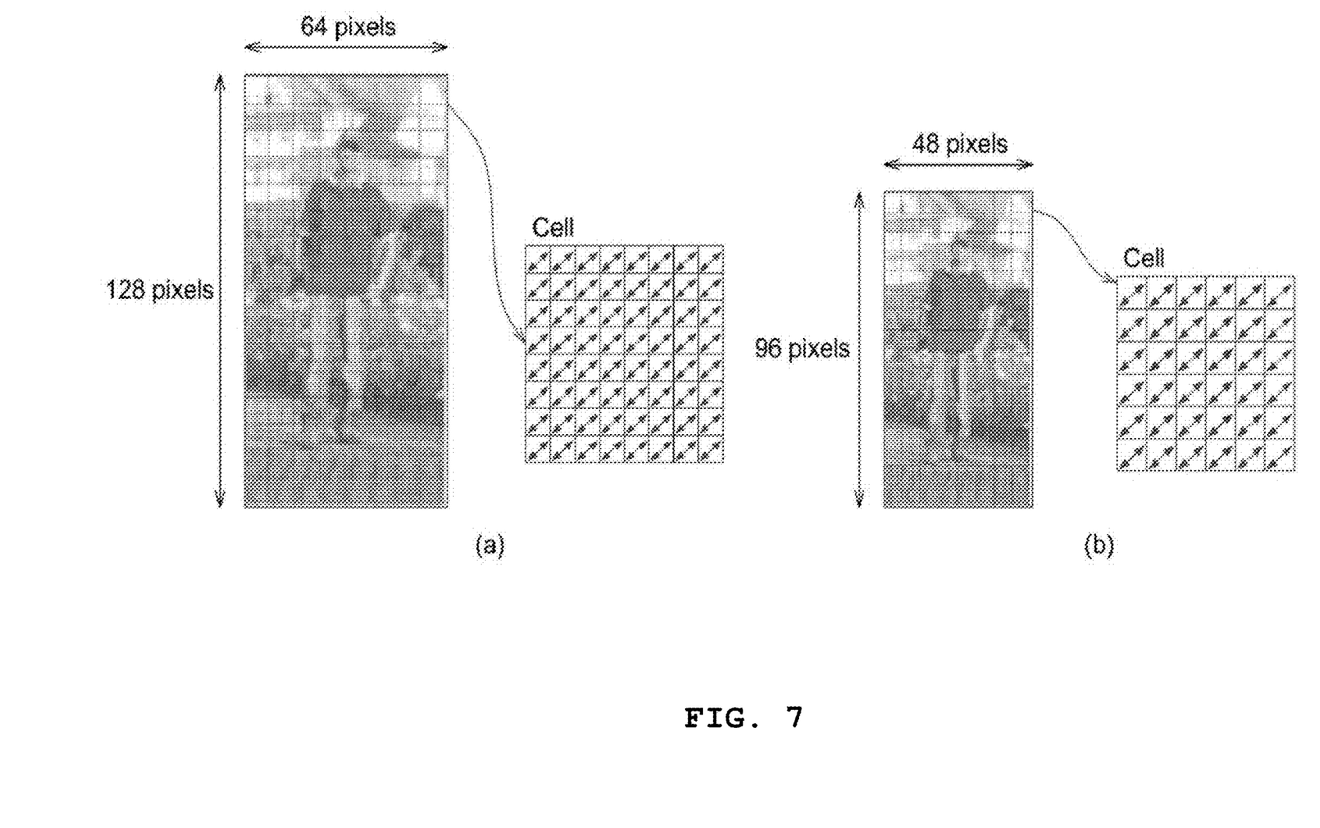
FIGS. 7A and 7B illustrate a process of adjusting the size of a pedestrian candidate object region by controlling the number of pixels included in one cell.

In an embodiment, the pedestrian possibility determination module 214 may adjust the size of the moving pedestrian candidate object by controlling the number of pixels included in one cell. FIGS. 7A and 7B illustrate the process of adjusting the size of the moving pedestrian candidate object region by controlling the number of pixels included in one cell.

FIG. 7A illustrates that 8 pixels×8 pixels are included in one cell, and FIG. 7B illustrates that 6 pixels×6 pixels are included in one cell.

A moving pedestrian candidate object far from the camera may be extracted as a relatively small region, and a moving pedestrian candidate object near to the camera may be extracted as a relatively large region. When the size of a cell is fixed to a predetermined size regardless of a distance (for example, 8 pixels×8 pixels), the region of the moving pedestrian candidate object may be defined as a small number of blocks, which may make the calculation complicated.

The pedestrian possibility determination module 214 may adjust the number of pixels included in one cell, and maintain the same numbers of cells and blocks in the region of the moving pedestrian candidate object regardless of the size of the corresponding region. Therefore, the pedestrian possibility determination module 214 can detect a smaller pedestrian (pedestrian farther from the camera) through the same template, while adjusting the size of the region of the moving pedestrian candidate object by controlling the number of pixels included in one cell.

Referring back to FIG. 2, the pedestrian determination unit 220 may cyclically perform the pedestrian candidate detection process, the mobility determination process and the pedestrian possibility determination process, thereby determining the possibility that one or more objects are pedestrians. The pedestrian determination unit 220 may raise the possibility that one or more objects are pedestrians, through the pedestrian candidate detection module 212, the mobility determination module 213 and the pedestrian possibility determination module 214.

The pedestrian collision possibility determination unit 230 determines a collision possibility of the object set to a pedestrian, based on the mobility of the object. When the corresponding object is likely to collide with the vehicle, the pedestrian collision possibility determination unit 230 may transparently overlay a visual guidance on the object, such that the object with the visual guidance is displayed on the screen.

When the object set to a pedestrian is away from the vehicle 10, the pedestrian collision possibility determination unit 230 may determine that the object is unlikely to collide with the vehicle. On the other hand, when the object set to a pedestrian approaches the vehicle 10, the pedestrian collision possibility determination unit 230 may determine that the vehicle 10 is likely to collide with the object set to the pedestrian, based on the distance between the vehicle 10 and the object. For example, the pedestrian collision possibility determination unit 230 may compare a previous image frame and the current image frame, and determine that the object set to a pedestrian is approaching the vehicle, when the object grows bigger in the image frames. On the other hand, the pedestrian collision possibility determination unit 230 may determine that the object set to a pedestrian is being away from the vehicle, when the object grows smaller in the image frame.

In an embodiment, when the object set to a pedestrian is likely to collide with the vehicle, the pedestrian collision possibility determination unit 230 may highlight the region of the object set to a pedestrian in the image received from the camera 20 or display an arrow (or indicator having a different shape) to visually inform a driver of a collision risk with the pedestrian. For example, the pedestrian collision possibility determination unit 230 may highlight the region in red when the collision risk is high or in yellow when the collision risk is medium.

The autonomous emergency braking unit 240 may check the collision possibility of the corresponding object with the vehicle 10, based on the distance between the object and the vehicle 10, and control the vehicle 10 to perform one or more of velocity reduction and warning sound generation. The autonomous emergency braking unit 240 may decide the distance between the corresponding object and the vehicle 10, based on the current velocity of the vehicle 10 and the information indicating whether the object is moving. For example, the autonomous emergency braking unit 240 may decide the distance between the object and the vehicle 10 based on the distance depending on the size of the region, and estimate the distance between the object and the vehicle 10 in consideration of the current velocity of the vehicle 10 and the moving direction of the object. In an embodiment, the pedestrian recognition apparatus may include a table for storing the distance depending on the size of the object region in advance. In an embodiment, the pedestrian recognition apparatus may include a table for storing the moving velocity of the object depending on a size variation of the object region or a positional change of the object region.

In an embodiment, the autonomous emergency braking unit 240 may generate a warning sound when the distance between the vehicle 10 and the corresponding object is less than a first reference distance, and decelerate the vehicle 10 and generate a warning sound when the distance between the vehicle 10 and the corresponding object is less than a second reference distance smaller than the first reference distance.

The autonomous emergency braking unit 240 may emergency-brake the vehicle 10 when an object which was not detected in a previous image frame is detected in the current image frame. For example, the autonomous emergency braking unit 240 may determine that the corresponding object suddenly appeared around the vehicle 10, thereby emergency-braking the vehicle 10.

The control unit 250 may control the overall operations of the pedestrian recognition apparatus 100, and control data flows and operations among the image receiving unit 210, the pedestrian determination unit 220, the pedestrian collision possibility determination unit 230 and the autonomous emergency braking unit 240.

Figure 8:
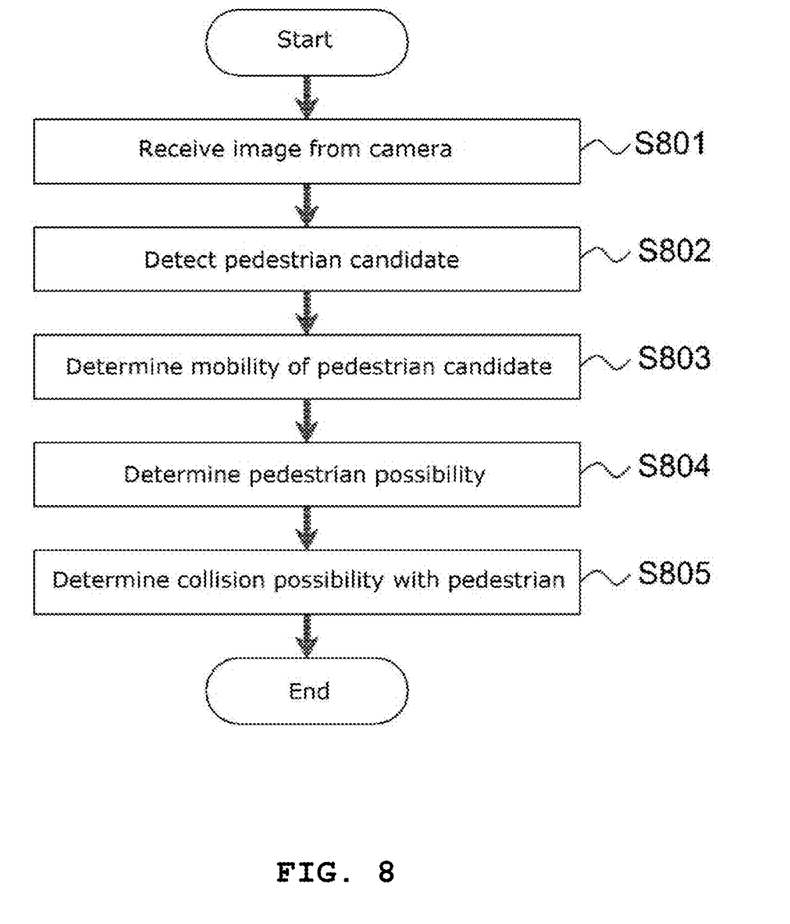
FIG. 8 is a flowchart illustrating a pedestrian recognition process performed in the pedestrian recognition apparatus of FIG. 1.

FIG. 8 is a flowchart illustrating the pedestrian recognition process performed in the pedestrian recognition apparatus of FIG. 1.

Referring to FIG. 8, the image receiving unit 210 receives an image from the camera 20 at step S801.

In an embodiment, the image receiving unit 210 may generate an around view based on the image acquired from the camera 20. The image receiving unit 210 may generate a time-series around view by combining two or more around views based on the images taken by the camera 20.

The pedestrian determination unit 220 extracts one or more objects from the image received from the camera 20 before the pedestrian candidate detection process. In an embodiment, the pedestrian determination unit 220 may detect edges in the image, and extract one or more objects each having an area equal to or more than a predetermined size distinguished by the edges. In another embodiment, the pedestrian determination unit 220 may extract one or more objects based on a color difference between the background and the object in the image received from the camera 20.

The pedestrian determination unit 220 may detect a pedestrian candidate object from the one or more objects extracted from the image received from the camera 20 at step S802.

In an embodiment, the pedestrian determination unit 220 may extract a feature corresponding to a specific feature of a pedestrian (detection target object) from the object through the simple feature analysis, and compare the extracted feature to detect a pedestrian candidate object. For example, the pedestrian determination unit 220 may detect a vertical component of the one or more objects, and determine a similarity between the vertical component and the pedestrian pattern, in order to detect the pedestrian candidate object.

The pedestrian determination unit 220 determines whether the pedestrian candidate object is moving, using a difference between a previous image and the current image at step S803.

The pedestrian determination unit 220 may determine whether the pedestrian candidate object is moving, based on differences of the same pedestrian candidate object in images from the current time to a specific previous time.

The pedestrian determination unit 220 determines the possibility that the moving pedestrian candidate object is a pedestrian, at step S804.

The pedestrian determination unit 220 may perform a HOG operation on the moving pedestrian candidate object, and perform an SVM weight operation on the HOG operation. When the operation result is equal to or more than a preset threshold value, the pedestrian determination unit 220 may set the pedestrian candidate object to a pedestrian. The pedestrian possibility determination module 214 may estimate the region of the pedestrian candidate object corresponding to the HOG operation region based on the near and far degree of the image received from the camera 20.

The pedestrian determination unit 220 may cyclically perform the pedestrian candidate detection process, the mobility determination process and the pedestrian possibility determination process, there determining the possibility that one or more objects are pedestrians.

The pedestrian collision possibility determination unit 230 determines a collision possibility of the object set to a pedestrian, based on whether the object is moving, at step S405.

When the corresponding object is likely to collide with the vehicle, the pedestrian collision possibility determination unit 230 may transparently overlay a visual guidance on the object, such that the object with the visual guidance is displayed on the screen.

While various embodiments have been described above, it will be understood to those skilled in the art that the embodiments described are by way of example only. Accordingly, the disclosure described herein should not be limited based on the described embodiments.

What is claimed is:

1. A pedestrian recognition apparatus comprising:
 a control unit including a processor using an algorithm stored on a non-transitory storage device, wherein the algorithm when executed by the processor causes the control unit to act as:
 an image receiving unit configured to sequentially receive a plurality of images from a camera; and
 a pedestrian determination unit configured to detect a pedestrian candidate object from one or more objects in the images, and to determine whether the pedestrian candidate object is moving, using the plurality of images, and to set the pedestrian candidate object to a moving pedestrian candidate object, and to perform a pedestrian possibility determination process by performing a predefined operation on the moving pedestrian candidate object, and to set the moving pedestrian candidate object to a pedestrian in response to detection of a value calculated through the predefined operation being equal to or more than a threshold value, wherein the pedestrian determination unit includes:
an object extraction module configured to extract one or more objects from an image received from the image receiving unit,
a pedestrian candidate detection unit configured to detect a pedestrian candidate object from one or more objects extracted by the object extraction module,
a mobility determination module configured to divide a current image frame and a previous image frame each into blocks of a predetermined size, and in response to detection of the pedestrian candidate object being included in a specific block of the current image frame, to calculate a sum of absolute difference (SAD) by summing up absolute values of the pixel value differences between pixels of the specific block of the current image frame and pixels of corresponding blocks of the previous image frame using an equation below, to determine the block of the previous image frame having the smallest SAD as a corresponding block of the current image frame, to set the pedestrian candidate object to a moving pedestrian candidate object in response to a determination that the positions of blocks corresponding to each other in the current image frame and the previous image frame were changed, and
a pedestrian possibility determination module configured to perform a HOG (Histogram of Oriented Gradient) operation on the moving pedestrian candidate object, to perform a support vector machine (SVM) weight operation on an HOG operation result, and to set the pedestrian candidate object to a pedestrian in response to detection of an SVM weight operation result being equal to or more than a preset threshold value, wherein the SAD is calculated based on the following equation:

$$SAD = \sum_{i=1}^{N} \sum_{j=1}^{M} |(I_{ij}(k) - I_{ij}(k-1))|,$$ [Equation]

wherein $I_{ij}(k)$ represents the pixel value of an i-th row and a j-th column of a block in a k-th image frame, and $I_{ij}(k-1)$ represents the pixel value of an i-th row and a j-th column of a block in a (k−1)th image frame.

2. The pedestrian recognition apparatus of claim 1, further comprising:
a pedestrian collision possibility determination unit configured to overlay a visual guidance on the object corresponding to the pedestrian on a display screen of a vehicle in response to determination that a distance between the pedestrian and the vehicle is decreasing such that the pedestrian and the vehicle have a likelihood to collide with each other.

3. The pedestrian recognition apparatus of claim 1, wherein the pedestrian determination unit is further configured to determine the possibility that the one or more objects are pedestrians.

4. The pedestrian recognition apparatus of claim 1, wherein the pedestrian determination unit is further configured to detect vertical components of the one or more objects in the pedestrian candidate object detection process, and to determine a similarity between the detected vertical components and a pedestrian pattern.

5. The pedestrian recognition apparatus of claim 1, wherein the pedestrian determination unit is further configured to estimate a region of the pedestrian candidate object, corresponding to a HOG operation region, based on a near and far degree of a received image.

6. The pedestrian recognition apparatus of claim 5, wherein the pedestrian determination unit is further configured to adjust a size of the region of the pedestrian candidate object using a plurality of cells having a variable size.

7. The pedestrian recognition apparatus of claim 1, further comprising:
an autonomous emergency braking unit configured to determine a collision possibility of the pedestrian with a vehicle, the determination is performed based on a distance between the pedestrian and the vehicle, and to control the vehicle by performing at least one of reducing velocity and generating a warning sound.

8. A computer-implemented pedestrian recognition method comprising:
sequentially receiving a plurality of images from a camera;
detecting a pedestrian candidate object from one or more objects in the images;
determining whether the pedestrian candidate object is moving, the determination is performed based on the plurality of images;
setting the pedestrian candidate object to a moving pedestrian candidate object by performing a predefined operation on the moving pedestrian candidate object, and setting the moving pedestrian candidate object to a pedestrian in response to detection of a value calculated through the predefined operation being equal to or more than a threshold value;
extracting one or more objects from an image received;
detecting a pedestrian candidate object from one or more objects extracted;
dividing a current image frame and a previous image frame each into blocks of a predetermined size, and in response to detection of the pedestrian candidate object being included in a specific block of the current image frame;
calculating a sum of absolute difference (SAD) by summing up absolute values of the pixel value differences between pixels of the specific block of the current image frame and pixels of corresponding blocks of the previous image frame through an equation below;
determining the block of the previous image frame having the smallest SAD as a corresponding block of the current image frame;
setting the pedestrian candidate object to a moving pedestrian candidate object in response to a determination that the positions of blocks corresponding to each other in the current image frame and the previous image frame were changed; and
performing a HOG (Histogram of Oriented Gradient) operation on the moving pedestrian candidate object, performing a support vector machine (SVM) weight operation on an HOG operation result, and setting the pedestrian candidate object to a pedestrian when an SVM weight operation result is equal to or more than a preset threshold value, wherein the SAD is calculated based on the following equation:

$$SAD = \sum_{i=1}^{N} \sum_{j=1}^{M} |(I_{ij}(k) - I_{ij}(k-1))|,$$ [Equation]

wherein $I_{ij}(k)$ represents the pixel value of an i-th row and a j-th column of a block in a k-th image frame, and $I_{ij}(k-1)$ represents the pixel value of an i-th row and a j-th column of a block in a (k−1)th image frame.

9. The pedestrian recognition method of claim 8, further comprising:
   determining that a vehicle and the pedestrian have a likelihood of colliding with each other in response to determination that a distance between the pedestrian and the vehicle is decreasing such that the pedestrian and the vehicle have a likelihood to collide with each other, and overlaying a visual guidance on the object corresponding to the pedestrian on a display screen of the vehicle.

10. The pedestrian recognition method of claim 8, further comprising:
   determining whether a vehicle and the pedestrian have a likelihood of colliding with each other, the determination being performed based on a distance between the pedestrian and the vehicle decreasing, and
   controlling the vehicle by performing at least one of reducing velocity and generating a warning sound.

\* \* \* \* \*